United States Patent
Lu et al.

(10) Patent No.: US 12,061,288 B2
(45) Date of Patent: Aug. 13, 2024

(54) APERIODIC MIRROR ARRAY FOR SUPPRESSED SIDE LOBE INTENSITY

(71) Applicant: Beijing Voyager Technology Co., Ltd., Beijing (CN)

(72) Inventors: Yue Lu, Mountain View, CA (US); Youmin Wang, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 861 days.

(21) Appl. No.: 17/094,655

(22) Filed: Nov. 10, 2020

(65) Prior Publication Data
US 2022/0146637 A1    May 12, 2022

(51) Int. Cl.
*G01C 3/08*  (2006.01)
*G01S 7/481*  (2006.01)
*G01S 17/931*  (2020.01)
*G02B 26/08*  (2006.01)
*G02B 26/10*  (2006.01)

(52) U.S. Cl.
CPC .......... *G01S 7/4817* (2013.01); *G01S 17/931* (2020.01); *G02B 26/0841* (2013.01); *G02B 26/101* (2013.01)

(58) Field of Classification Search
CPC .. G01S 7/4817; G02B 26/0841; G02B 26/101
See application file for complete search history.

(56) References Cited

U.S. PATENT DOCUMENTS

| | | | |
|---|---|---|---|
| 2003/0122206 A1* | 7/2003 | Bhattarai | B81C 1/00238 438/50 |
| 2008/0130081 A1 | 6/2008 | Tsai et al. | |
| 2008/0204861 A1 | 8/2008 | Shiraishi | |
| 2011/0228370 A1 | 9/2011 | Tsai et al. | |
| 2015/0160561 A1 | 6/2015 | Saenger et al. | |
| 2019/0353893 A1* | 11/2019 | Wu | G02B 26/02 |
| 2020/0013181 A1 | 1/2020 | Uyeno et al. | |
| 2021/0208251 A1* | 7/2021 | Smith | G01S 17/931 |

FOREIGN PATENT DOCUMENTS

WO   WO 2019020708 A1 *  1/2019  ......... G02B 26/0833

* cited by examiner

*Primary Examiner* — Mark Hellner
(74) *Attorney, Agent, or Firm* — Kilpatrick Townsend & Stockton LLP

(57) ABSTRACT

A micro-electromechanical system (MEMS) micro-mirror arrays with an aperiodic structure is described. This avoids the undesired noise of sidelobes generated by the gaps between rows of mirrors, where a periodic structure forms a diffraction pattern. A MEMS apparatus has a MEMS mirror array structure with a plurality of rows. The widths of the rows are sized to be different, so that the pattern of gaps between rows is aperiodic. This has the effect of spreading diffraction nodes beyond the 0 order, thus limiting the interference of diffracted nodes and improving the signal to noise ratio. In particular, the width of a mirror will vary in different rows, while all of the mirrors in a particular row will have the same width and same size.

17 Claims, 13 Drawing Sheets

APERIODIC MIRROR ARRAY FOR SUPPRESSED SIDE LOBE INTENSITY

BACKGROUND OF THE INVENTION

Modern vehicles are often equipped with sensors designed to detect objects and landscape features around the vehicle in real-time to enable technologies such as lane change assistance, collision avoidance, and autonomous driving. Some commonly used sensors include image sensors (e.g., infrared or visible light cameras), acoustic sensors (e.g., ultrasonic parking sensors), radio detection and ranging (RADAR) sensors, magnetometers (e.g., passive sensing of large ferrous objects, such as trucks, cars, or rail cars), and light detection and ranging (LiDAR) sensors.

A LiDAR system typically uses a light source and a light detection system to estimate distances to environmental features (e.g., pedestrians, vehicles, structures, plants, etc.). For example, a LiDAR system may transmit a light beam (e.g., a pulsed laser beam) to illuminate a target and then measure the time it takes for the transmitted light beam to arrive at the target and then return to a receiver near the transmitter or at a known location. In some LiDAR systems, the light beam emitted by the light source may be steered across a two-dimensional or three-dimensional region of interest according to a scanning pattern, to generate a "point cloud" that includes a collection of data points corresponding to target points in the region of interest. The data points in the point cloud may be dynamically and continuously updated, and may be used to estimate, for example, a distance, dimension, location, and speed of an object relative to the LiDAR system.

Light steering typically involves the projection of light in a pre-determined direction to facilitate, for example, the detection and ranging of an object, the illumination and scanning of an object, or the like. Light steering can be used in many different fields of applications including, for example, autonomous vehicles, medical diagnostic devices, etc., and can be configured to perform both transmission and reception of light. For example, a light steering transmitter may include a micro-mirror to control the projection direction of light to detect/image an object. Moreover, a light steering receiver may also include a micro-mirror to select a direction of incident light to be detected by the receiver, to avoid detecting other unwanted signals. A micro-mirror assembly typically includes a micro-mirror and an actuator. In a micro-mirror assembly, a mirror-mirror can be connected to a substrate via a connection structure (e.g., a torsion bar, a spring, etc.) to form a pivot point. One such type of micro-mirror assembly can be a micro-electromechanical system (MEMS)-type structure that may be used for a light detection and ranging (LiDAR) system in an autonomous vehicle, which can be configured for detecting objections and determining their corresponding distances from the vehicle. LiDAR systems typically work by illuminating a target with an optical pulse and measuring the characteristics of the reflected return signal. The return signal is typically captured as a point cloud. The width of the optical-pulse often ranges from a few nanoseconds to several microseconds.

In a LiDAR system, the MEMS mirror aperture plays an important role as it typically acts as the transmission (TX) aperture, which determines the divergence and resolution of the system. The MEMS mirror aperture also often acts as the receiving (RX) aperture because the MEMS mirror redirects the reflected light beam to a receiver sensor. Thus, it determines how much signal light can be collected. To enlarge the MEMS aperture, arrays of MEMS mirrors have been used. However, one drawback of the mirror array system is that since the mirror elements in the array form a periodic pitched structure, it functions similar to a grating structure which gives out side lobe beams. These side lobe beams can interfere with the "real" signal beam.

BRIEF SUMMARY OF THE INVENTION

Techniques disclosed herein relate generally to microelectromechanical (MEMS) mirrors that can be used in, for example, light detection and ranging (LiDAR) systems or other light beam steering systems. More specifically, and without limitation, disclosed herein are MEMS micro-mirror arrays with an aperiodic structure.

According to certain embodiments, a micro-electromechanical system (MEMS) apparatus has a MEMS mirror array structure with a plurality of rows. The widths of the rows are sized to be different, so that the pattern of gaps between rows is aperiodic. This has the effect of spreading diffraction nodes beyond the O order, thus limiting the interference of diffracted nodes and improving the signal to noise ratio. In particular, the width of a mirror will vary in different rows, while all of the mirrors in a particular row will have the same width and same size.

Certain embodiments provide a micro-electromechanical system (MEMS) apparatus for beam steering in a Light Detection and Ranging (LiDAR) system of an autonomous vehicle. A laser emits a laser beam which covers the aperture of an array of MEMS mirrors. Each mirror has a reflective surface for intercepting the laser beam and redirecting it toward an environment to be detected. The array of MEMS mirrors has a plurality of rows of mirrors with multiple mirrors in each row. Each mirror in a row of mirrors is the same size, but multiple rows have mirrors with a different size than adjacent rows, such that the pattern of gaps between rows is an irregular pattern. There is at least one detector for detecting at least one reflected beam of the laser beam. A controller is configured to control the laser and the angles of the mirrors in the array of MEMS mirrors to scan an environment.

Certain embodiments provide a method for manufacturing a MEMS mirror array. The method includes providing an array of MEMS mirrors consisting of a plurality of rows with a plurality of MEMS mirrors in each row. All of the MEMS mirrors are configured to rotate at the same resonant frequency to the same angles. The gaps between the rows of MEMS mirrors will produce a diffraction pattern from reflected light. The method varies the width of the MEMS mirrors in different rows to provide a spacing of the gaps between the rows of MEMS mirrors that is sufficiently aperiodic to provide a reduction of the intensity of a plurality of side lobes of the diffraction pattern by more than 50% of the intensity of a diffraction pattern with a periodic spacing of the gaps between the rows of MEMS mirrors.

One embodiment of the method provides an initial array design with all the MEMS mirrors having the same size. The method performs an iterative optimization of the widths of the MEMS mirrors in different rows to reduce the intensity of the plurality of side lobes of the diffraction pattern. The iterative optimization changes the widths of the MEMS mirrors and then performs a far field calculation using a Fraunhofer diffraction equation to determine an amplitude of the side lobes of the diffraction pattern. The amplitude of the side lobes is compared to a desired maximum limit. The widths of the MEMS mirrors are iteratively changed until the amplitude of the side lobes is less than or equal to the desired maximum limit. In one embodiment, the iterative optimization is a Particle Swarm Optimization.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will, be more apparent from the following detailed description taken in conjunction with the accompanying drawings, in which.

DETAILED DESCRIPTION OF THE INVENTION

Aspects of the present disclosure relate generally to a LiDAR system, and more particularly to MEMS mirror arrays.

In the following description, various examples of MEMS-based micro mirror structures are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

According to certain embodiments, a micro-electromechanical system (MEMS) apparatus has a MEMS mirror structure with an array of mirrors. There are gaps between each row of mirrors due to the limits of manufacturing tolerances. The gaps act as a diffraction grating, causing diffraction side lobes that reduce the signal to noise ratio (SNR) of the detected signals.

To solve this problem, an aperiodic mirror array structure is provided. Instead of using uniform mirror element size, the mirror width of every single element is designed so that together they don't form the grating diffraction effect.

The following high level summary is intended to provide a basic understanding of some of the novel innovations depicted in the figures and presented in the corresponding descriptions provided below. Techniques disclosed herein relate generally to microelectromechanical (MEMS) mirrors that can be used in, for example, light detection and ranging (LiDAR) systems or other light beam steering systems. More specifically, and without limitation, disclosed herein is a MEMS micro-mirror array structure with a plurality of rows. The widths of the rows are sized to be different, so that the pattern of gaps between rows is aperiodic. This has the effect of spreading diffraction nodes caused by the gap pattern beyond the 0 order, thus limiting the interference of diffracted nodes and improving the signal to noise ratio. In particular, the width of a mirror will vary in different rows, while all of the mirrors in a particular row will have the same width and same size. The mirrors in the same row have the same size because they are commonly driven to the same angle, with the same control circuitry. Thus different sizes would produce different lag times and resonant frequencies, making coordinated control extremely difficult.

Figure 7A:
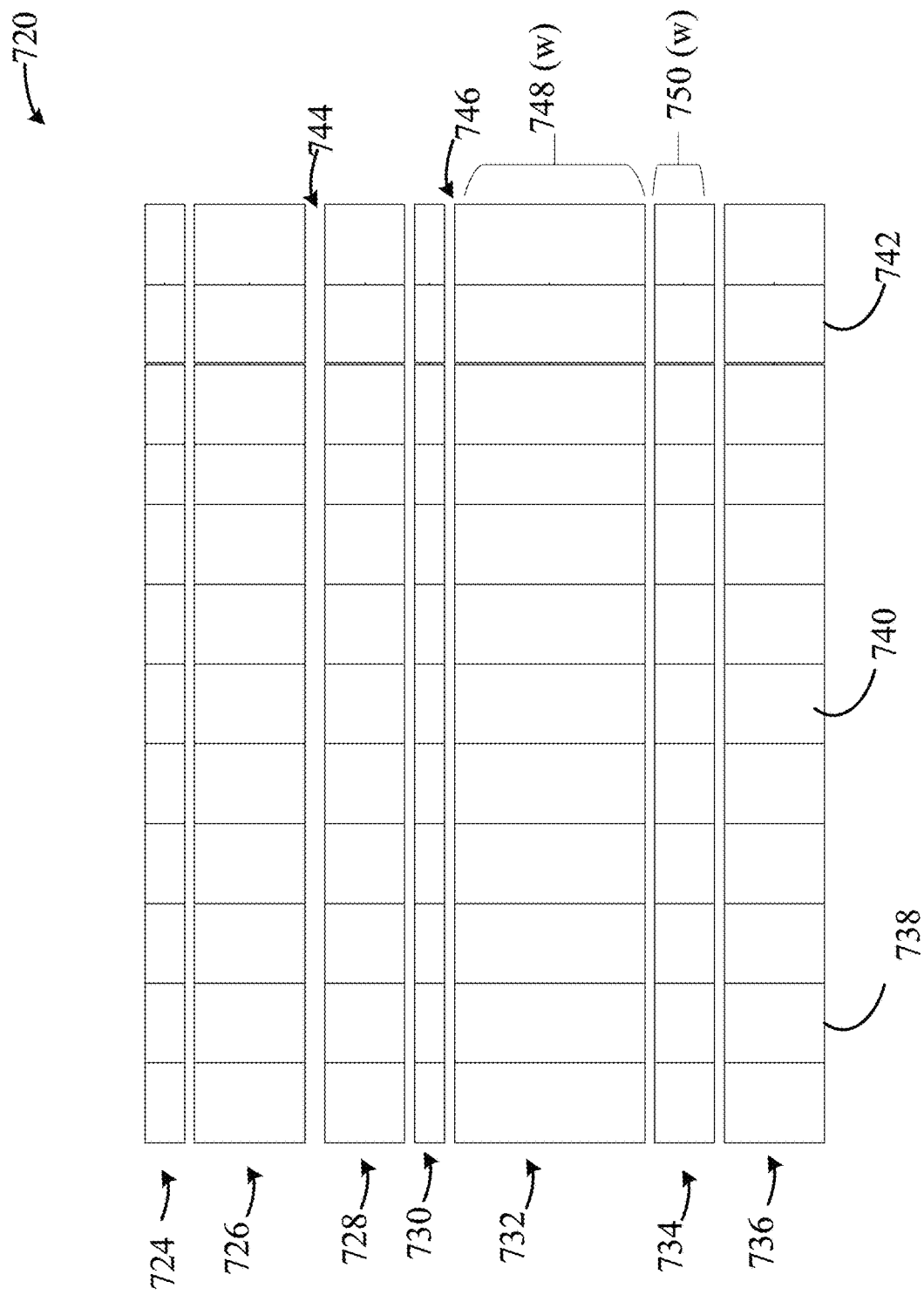
FIG. 7A is a diagram illustrating a mirror array 720 according to embodiments of the invention, with an aperiodic structure.

Certain embodiments provide a micro-electromechanical system (MEMS) apparatus for beam steering in a Light Detection and Ranging (LiDAR) system of an autonomous vehicle. A laser emits a laser beam which covers the aperture of an array of MEMS mirrors as shown in FIG. 7A, discussed below. The array of MEMS mirrors has a plurality of rows of mirrors with multiple mirrors in each row. Each mirror in a row of mirrors is the same size, but multiple rows have mirrors with a different size than adjacent rows, such that the pattern of gaps between rows is an irregular pattern. There is at least one detector for detecting at least one reflected beam of the laser beam. A controller is configured to control the laser and the angles of the mirrors in the array of MEMS mirrors to scan an environment.

Generally, aspects of the invention are directed to implementations of light steering, which can be used in a number of different applications. For example, a Light Detection and Ranging (LiDAR) module of an autonomous vehicle may incorporate a light steering system. The light steering system can include a transmitter and receiver system to steer emitted incident light in different directions around a vehicle, and to receive reflected light off of objects around the vehicle using a sequential scanning process, which can be used to determine distances between the objects and the vehicle to facilitate autonomous navigation.

Light steering can be implemented by way of an array of micro-mirror assemblies, with each micro-mirror assembly having a movable micro-mirror and an actuator (or multiple actuators). The micro-mirrors and actuators can be formed as microelectromechanical systems (MEMS) on a semiconductor substrate, which allows for the integration of the MEMS with other circuitries (e.g., controller, interface circuits, etc.) on the semiconductor substrate, which can allow for simpler, easier, more robust, and cost-effective manufacturing processes.

In a micro-mirror assembly, a micro-mirror can be mechanically connected (e.g., "anchored") to the semiconductor substrate via a connection structure (e.g., torsion bar, torsion spring, torsion beam, etc.) to form a pivot point and an axis of rotation. As described herein, "mechanically connected," or "connected," can include a direct connection or an indirect connection. For example, the micro-mirror can be indirectly connected to the substrate via a connection structure (e.g., torsion bar or torsion spring) to form a pivot/connection point. The micro-mirror can be rotated around the pivot/connection point ("referred to herein as a pivot point") on the axis of rotation by an actuator. In the embodiments presented herein an electrostatic actuator is typically used; however, any suitable type of actuator may be implemented (e.g., piezoelectric, thermal mechanical, etc.), and one of ordinary skill in the art with the benefit of this disclosure would appreciate the many modifications, combinations, variations, and alternative embodiments thereof.

In some embodiments, each micro-mirror can be configured to be rotated by a rotation angle to reflect (and steer) light towards a target direction. The connection structure can be deformed to accommodate the rotation, but the connection structure also has a degree of spring stiffness, which varies with the rotation angle and counters the rotation of the micro-mirror to set a target rotation angle. To rotate a micro-mirror by a target rotation angle, an actuator can apply a torque to the micro-mirror based on the rotational moment of inertia of the mirror, as well as the degree of spring stiffness for a given target rotation angle. Different torques can be applied to rotate (e.g., oscillate) the micro-mirror at or near a resonant frequency to achieve different target rotation angles. The actuator can then remove the torque, and the connection structure can return the micro-mirror back to its default orientation for the next rotation. The rotation of the micro-mirror can be repeated in the form of an oscillation, typically at or near a resonant frequency of the micro-mirror based on the mass of the micro-mirror and the spring constant of the connection structure (e.g., shown as a torsion bar throughout the figures of this disclosure). In the various embodiments described throughout this disclosure, references to rotating a micro-mirror "at or near" a resonant frequency can mean within a particular range of the resonant frequency. For instance, "at or near" a resonant frequency may mean within +/−5% of the resonant frequency, although other tolerances are possible (e.g., +/−1%, +/−2%, +/−3%, +/−10%, etc.), as would be appreciated by one of ordinary skill in the art with the benefit of this disclosure. Other terms that can mean "at or near" in the manner described above include "approximately," "substantially," or the like. In some embodiments, connection structures may be configured on opposite and diametrically opposed sides of a mirror or gimbal.

In certain embodiments, each micro-mirror can be configured to receive an incident light beam at a common rotation angle with the other micro-mirrors in the array to collectively steer the incident light beam at a target direction (e.g., in front of the vehicle). In some embodiments, each micro-mirror can be rotated around two orthogonal axes to provide a first range of angles of projection along a vertical dimension and to provide a second range of angles of projection along a horizontal dimension. The first range and the second range of angles of projection can define a two-dimensional field of view (FOV) in which light is projected to detect/scan an object. The FOV can also define a two-dimensional range of directions of incident lights that can be reflected by the object and detected by the receiver. Less commonly, LiDAR systems may also operate over a single axis (e.g., along a horizontal direction). One of ordinary skill in the art with the benefit of this disclosure would appreciate the many implementations and alternative embodiments thereof.

Typical System Environment for Certain Embodiments of the Invention

Figure 1:
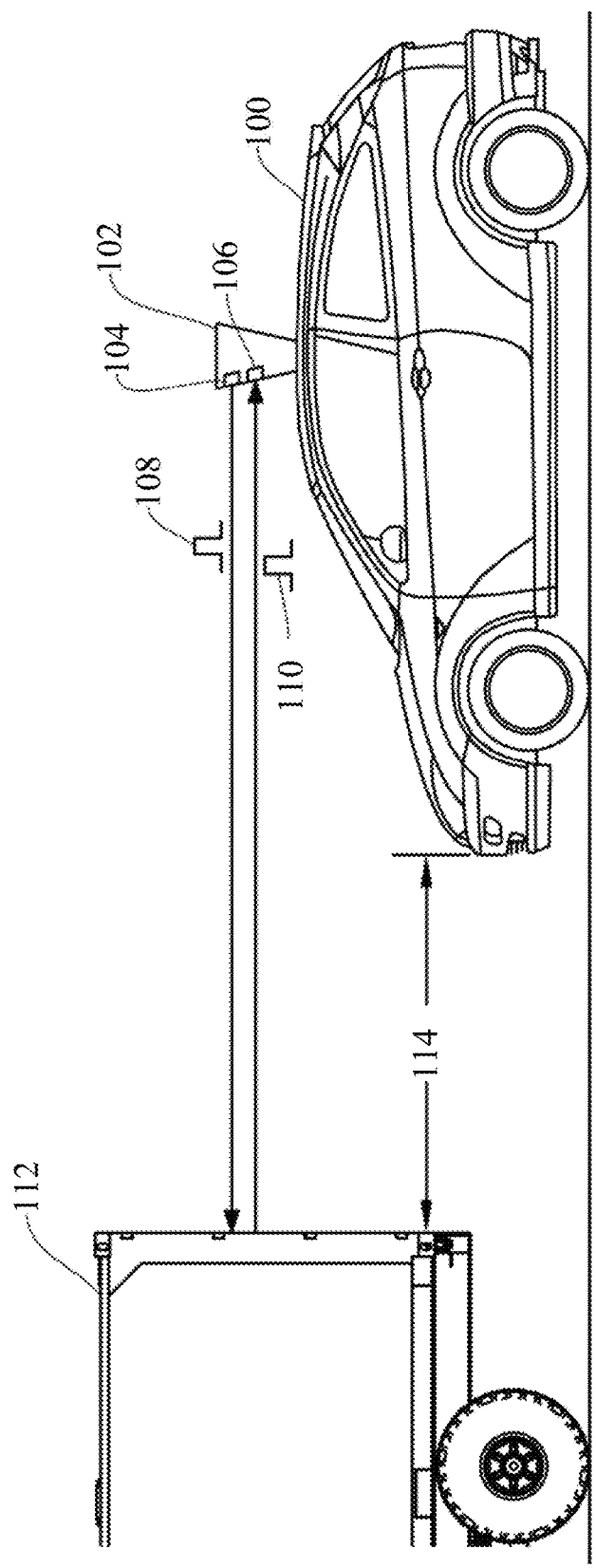
FIG. 1 shows an autonomous vehicle with a LiDAR system, according to certain embodiments.

FIG. 1 illustrates an autonomous vehicle 100 in which the various embodiments described herein can be implemented. Autonomous vehicle 100 can include a LiDAR module 102. LiDAR module 102 allows autonomous vehicle 100 to perform object detection and ranging in a surrounding environment. Based on the result of object detection and ranging, autonomous vehicle 100 can drive according to the rules of the road and maneuver to avoid a collision with detected objects. LiDAR module 102 can include a light steering transmitter 104 and a receiver 106. Light steering transmitter 104 can project one or more light signals 108 at various directions (e.g., incident angles) at different times in any suitable scanning pattern, while receiver 106 can monitor for a light signal 110 which is generated by the reflection of light signal 108 by an object. Light signals 108 and 110 may include, for example, a light pulse, a frequency modulated continuous wave (FMCW) signal, an amplitude modulated continuous wave (AMCW) signal, etc. LiDAR module 102 can detect the object based on the reception of light signal 110, and can perform a ranging determination (e.g., a distance of the object) based on a time difference between light signals 108 and 110, as would be appreciated by one of ordinary skill in the art with the benefit of this disclosure. For example, as shown in FIG. 1, LiDAR module 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. Autonomous vehicle 100 can thereby adjust its speed (e.g., slowing or stopping) to avoid collision with object 112 based on the detection and ranging of object 112 by LiDAR module 102.

Figure 2A:
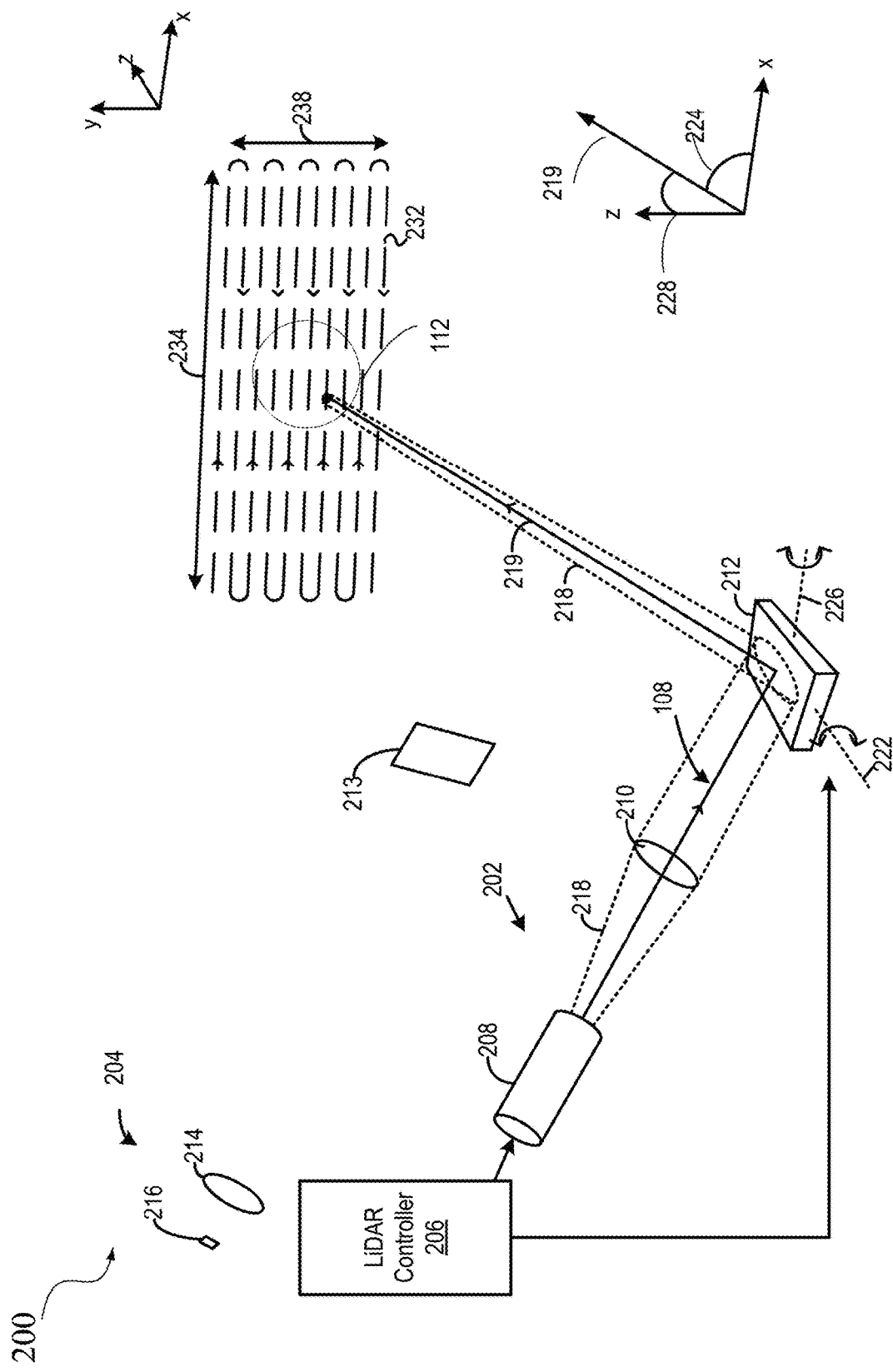
FIG. 2A shows an example of a light projection operation, according to certain embodiments.
Figure 2B:
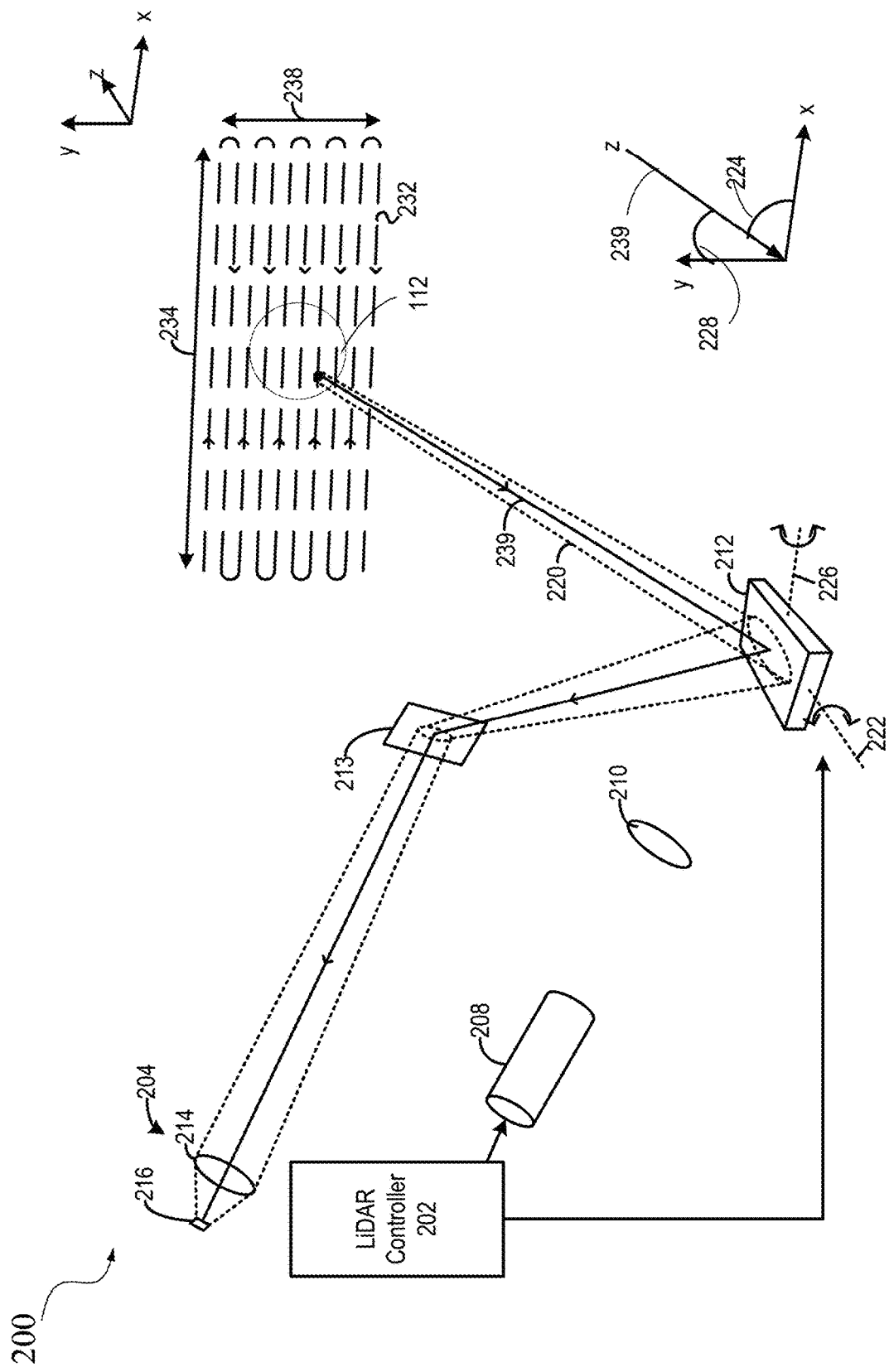
FIG. 2B shows an example of a light detection operation, according to certain embodiments.

FIG. 2A and FIG. 2B illustrate simplified block diagrams of an example of a LiDAR module 200 according to certain embodiments. LiDAR module 200 may be an example of LiDAR system 102, and may include a transmitter 202, a receiver 204, and LiDAR controller 206, which may be configured to control the operations of transmitter 202 and receiver 204. Transmitter 202 may include a light source 208 and a collimator lens 210, and receiver 204 can include a lens 214 and a photodetector 216. LiDAR module 200 may further include a mirror assembly 212 (also referred to as a "mirror structure") and a beam splitter 213. In some embodiments, LiDAR module 102, transmitter 202 and receiver 204 can be configured as a coaxial system to share mirror assembly 212 to perform light steering operations, with beam splitter 213 configured to reflect incident light reflected by mirror assembly 212 to receiver 204.

FIG. 2A shows an example of a light projection operation, according to certain embodiments. To project light, LiDAR controller 206 can control light source 208 (e.g., a pulsed laser diode, a source of FMCW signal, AMCW signal, etc.) to transmit light signal 108 as part of light beam 218. Light beam 218 can disperse upon leaving light source 208 and can be converted into collimated light beam 218 by collimator lens 210. Collimated light beam 218 can be incident upon a mirror assembly 212, which can reflect collimated light beam 218 to steer it along an output projection path 219 towards object 112. Mirror assembly 212 can include one or more rotatable mirrors. FIG. 2A illustrates mirror assembly 212 as having one mirror; however, a micro-mirror array may include multiple micro-mirror assemblies that can collectively provide the steering capability described herein. Mirror assembly 212 can further include one or more actuators (not shown in FIG. 2A) to rotate the rotatable mirrors. The actuators can rotate the rotatable mirrors around a first axis 222, and can rotate the rotatable mirrors along a second axis 226. The rotation around first axis 222 can change a first angle 224 of output projection path 219 with respect to a first dimension (e.g., the x-axis), whereas the rotation around second axis 226 can change a second angle 228 of output projection path 219 with respect to a second dimension (e.g., the z-axis). LiDAR controller 206 can control the actuators to produce different combinations of angles of rotation around first axis 222 and second axis 226 such that the movement of output projection path 219 can follow a scanning pattern 232. A range 234 of movement of output projection path 219 along the x-axis, as well as a range 238 of movement of output projection path 219 along the z-axis, can define a FOV. An object within the FOV, such as object 112, can receive and reflect collimated light beam 218 to form reflected light signal, which can be received by receiver 204 and detected by the LiDAR module, as further described below with respect to FIG. 2B. In certain embodiments, mirror assembly 212 can include one or more comb spines with comb electrodes (see, e.g., FIG. 3), as will be described in further detail below.

FIG. 2B shows an example of a light detection operation, according to certain embodiments. LiDAR controller 206 can select an incident light direction 239 for detection of incident light by receiver 204. The selection can be based on setting the angles of rotation of the rotatable mirrors of mirror assembly 212, such that only light beam 220 propagating along light direction 239 gets reflected to beam splitter 213, which can then divert light beam 220 to photodetector 216 via collimator lens 214. With such arrangements, receiver 204 can selectively receive signals that are relevant for the ranging/imaging of object 112 (or any other object within the FOV), such as light signal 110 generated by the reflection of collimated light beam 218 by object 112, and not to receive other signals. As a result, the effect of environmental disturbance on the ranging and imaging of the object can be reduced, and the system performance may be improved.

Aperiodic Mirror Array for Suppressed Side Lobe Intensity

Figures 3A, 3B:
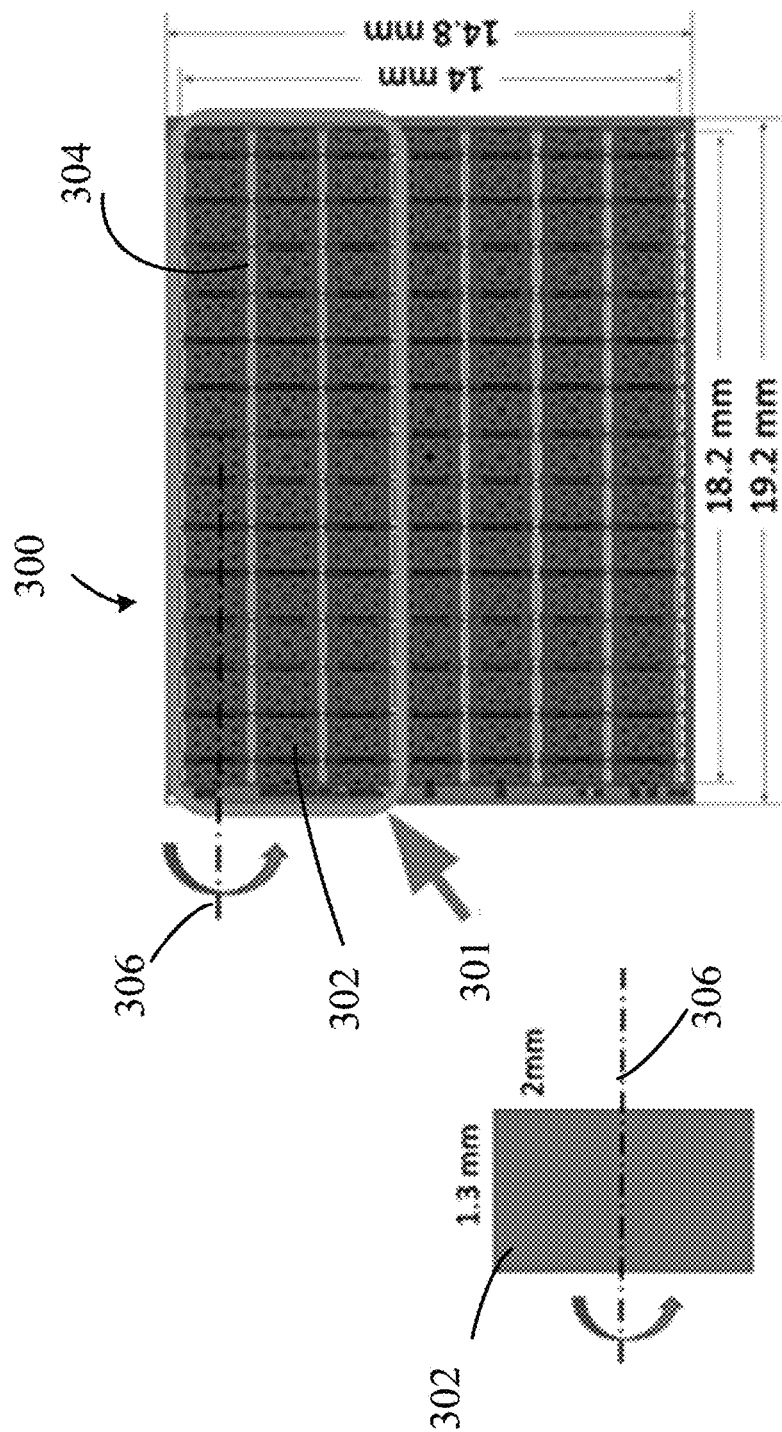
FIG. 3A is a diagram of a MEMS mirror array structure, according to certain embodiments.
FIG. 3B is a diagram of a mirror in the mirror array of FIG. 3, according to certain embodiments.

FIG. 3A is a diagram of a MEMS mirror array structure, according to certain embodiments. FIG. 3A shows the mirror array 300 composed of seven rows of mirrors 302, and 15 columns. Each row rotates around an axis 302 to tilt the mirrors to redirect a laser beam. The dimensions of the mirror array in this embodiment are 14 mm by 18 mm. The mirror array is visible through an opening or aperture of a chip package, with borders forming a 14.8 mm by 19.2 mm face. Alternately, a smaller array 301 could be used. Between each row, there is a gap 304.

FIG. 3B is a diagram of a mirror 302 in the mirror array 300 of FIG. 3, according to certain embodiments. The mirror rotates about an axis 306. The amount of rotation changes the angle at which a laser beam is reflected.

A laser beam will typically be sized to cover most if not all of the mirror array 300. To the extent the laser beam profile is larger, the portions outside the aperture will be lost and not reflected. By using an array of mirrors, the array functions as a large aperture. A larger aperture results in narrower lobes in the diffraction pattern, and thus a more concentrated signal, but also closer side lobes. All of the mirrors in mirror array 300 typically move in unison. Thus, mirror 300 acts as a single large mirror.

Figure 4:
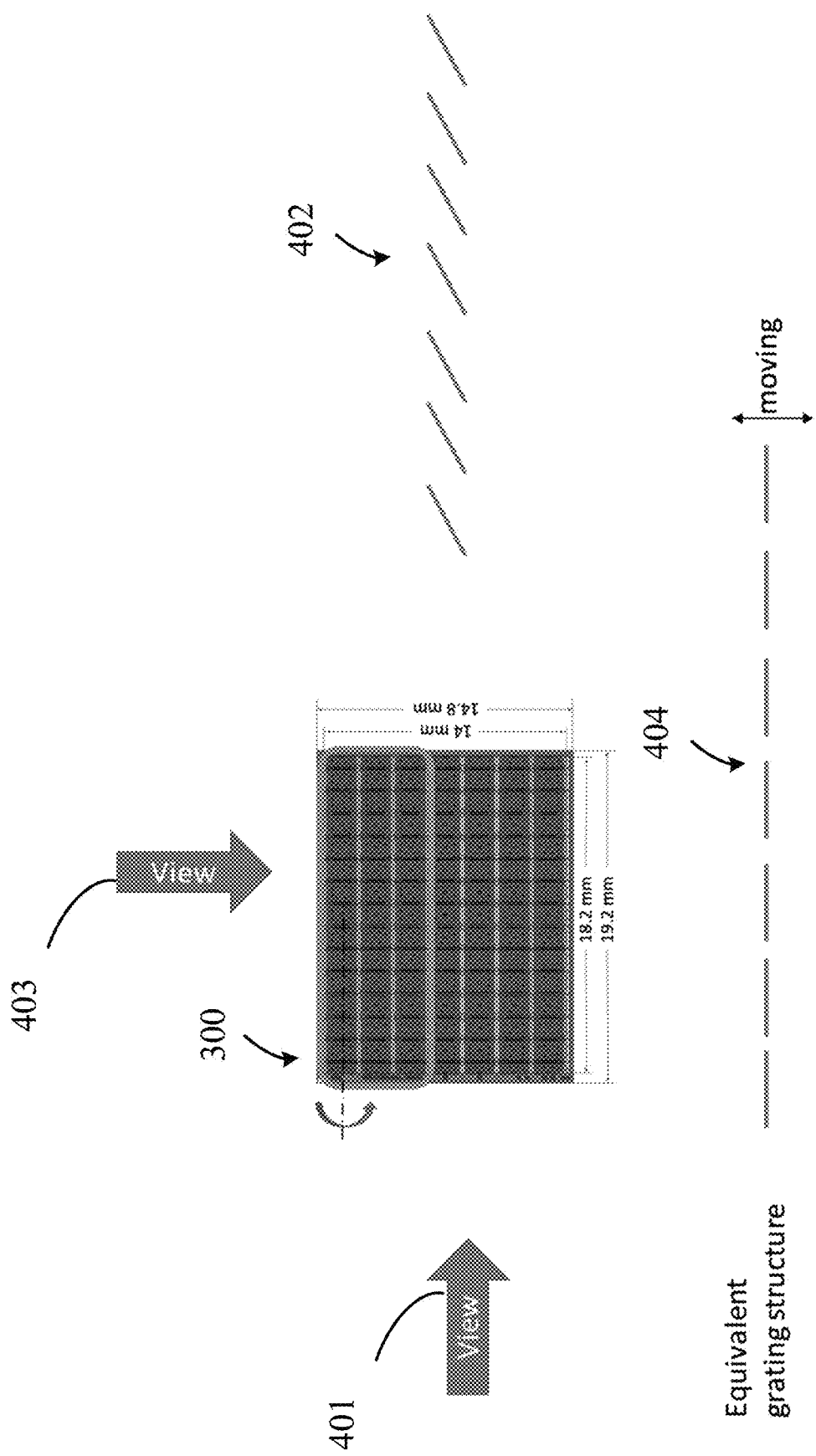
FIG. 4 is a diagram up the mirror array of FIG. 3A, illustrating the tilted mirrors producing a diffraction grating, according to embodiments.

FIG. 4 is a diagram of the mirror array 300 of FIG. 3A, illustrating the tilted mirrors producing an unintended diffraction grating, according to embodiments. Lines 402 illustrate the mirrors in a row tilted at an angle, as viewed from a direction indicated by arrow 401. As the mirrors tilt, a gap forms between each mirror as viewed from above as indicated by arrow 403, resulting in a pattern illustrated by lines 404. Because the mirrors are of equal size, and are tilted at the same angle, this forms a regular pattern of mirrors and gaps. In fact, this forms a classic diffraction pattern, as an unintended consequence of the gap between mirror rows. Diffraction is the slight bending of light as it passes around the edge of an object. The amount of bending depends on the relative size of the wavelength of light to the size of the opening. If the opening is much larger than the light's wavelength, the bending will be almost unnoticeable. However, if the two are closer in size or equal, the amount of bending is considerable. Optical effects resulting from diffraction are produced through the interference of light waves.

Figure 5:
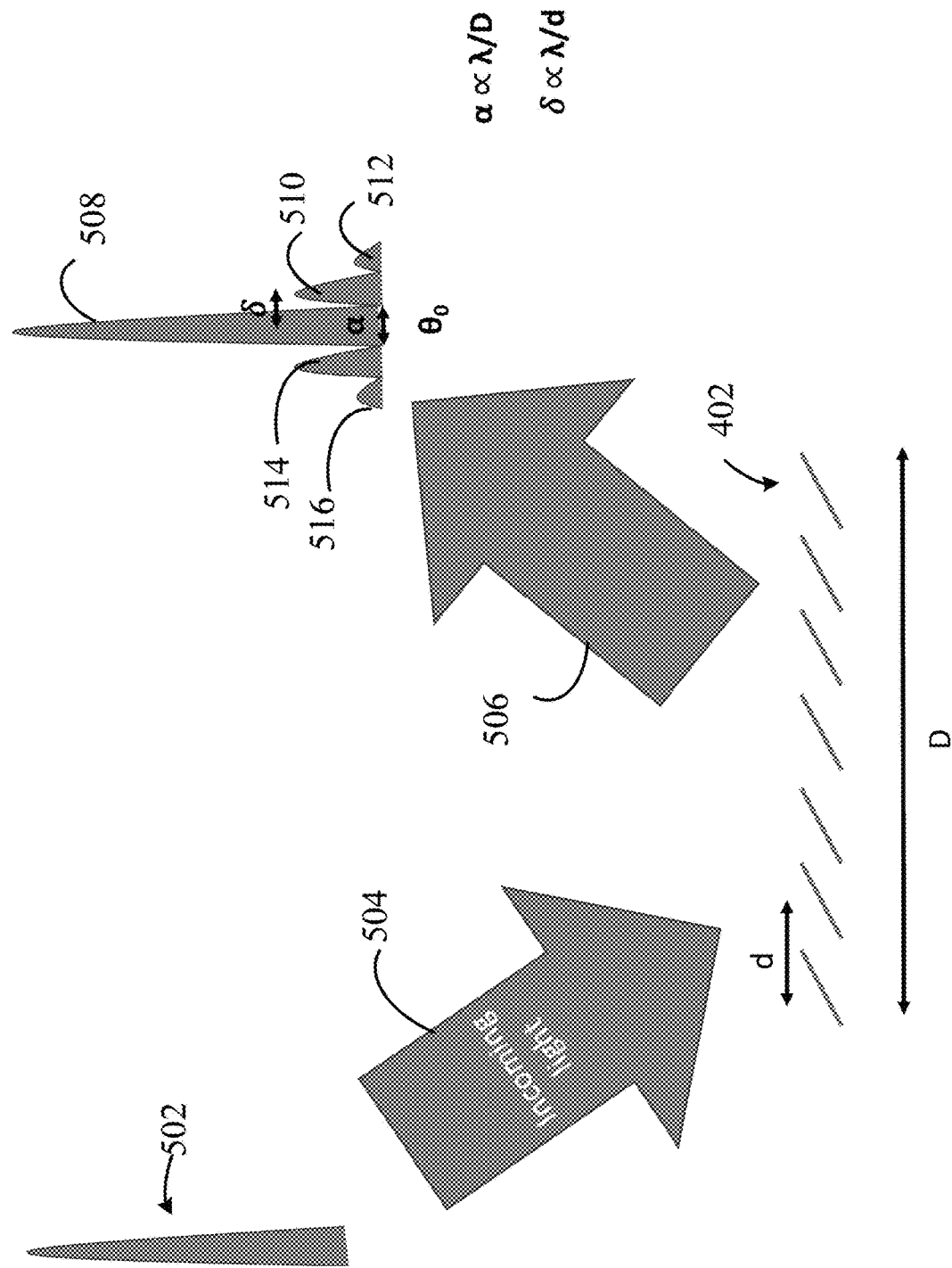
FIG. 5 is a diagram illustrating the production of additional diffraction lobes due to the diffraction grating of FIG. 4, according to embodiments.

FIG. 5 is a diagram illustrating the production of additional diffraction lobes due to the diffraction grating of FIG. 4, according to embodiments. An incoming laser beam 502, coming in as shown by arrow 504, reflects off the mirrors 402. The reflection travels as indicated by arrow 506 to produce a diffraction pattern due to the gaps between the mirrors. This diffraction produces a main, or 0 order lobe 508, but also produces a +1 order lobe 510, a +2 order lobe 512, a −1 order lobe 514 and a −2 order lobe 516. Additional lobes of orders 3, 4, etc. may be produced, although they will be of diminished intensity.

The gaps between the mirrors form a diffraction pattern of lobes that is a Poisson Distribution. This can be calculated using a Fourier Transform. The aperture, shown as D in FIG. 5, determines the width of the lobes according to the equation $\alpha \propto \lambda/D$, where $\alpha$=lobe width, $\lambda$=wavelength, and D=diameter of the aperture. Thus, the larger the aperture, the narrower the width of the lobes (defined in degrees). Thus, a larger aperture produces a narrower, or more collimated, beam.

The spacing of the lobes is determined by the distance between lobes, δ. As can be seen, δ is inversely proportional to the distance between individual mirrors, d. This distance d is the distance between the center points of each adjacent mirror. The spacing distance is set forth by the formula δ∝λ/d, or δ=arcsine(λ/2d). For example, a gap of 5 nanometers would give a separation, or beam divergence, of about 0.1 degrees for an infrared light beam.

In the limit where the target is far from the grating, the integral expression describing the diffraction pattern can be rewritten in terms of a Fourier transform. That is, the diffraction pattern is the Fourier transform of some interpretation of the density function. The Fraunhofer diffraction pattern is the Fourier transform of the amplitude function leaving the diffracting aperture. In optics, the Fraunhofer diffraction equation is used to model the diffraction of waves when the diffraction pattern is viewed at a long distance from the diffracting object. Equation (1) below is the Fraunhofer diffraction equation:

$$U(f_x) = A * FT\{r(\xi)\} =$$

$$A * \sum_{n=0}^{N-1} [a_n \text{sinc}(a_n f_x) e^{-i\xi_n(2\pi f_x + C)}] * \delta\left(f_x - \frac{C}{2\pi}\right)$$

where $A =$ $$A * \sum_{n=0}^{N-1} \left[a_n \text{sinc}\left(a_n\left(f_x - \frac{C}{2\pi}\right)\right) e^{-i\xi_n\left(2\pi\left(f_x - \frac{C}{2\pi}\right) + C\right)}\right]$$

$$\frac{e^{ikz} e^{\frac{ikz(f_x \lambda)^2}{2}}}{ikz}$$

Equation (1)

Where:

A=amplitude

U=complex amplitude k=wavenumber

FT=Fourier transform

ξ=location of the a mirror element z=observation distance c=velocity of light

C=slope of the mirror tilting f=frequency

When the diffraction pattern is periodic, the Fraunhofer equation provides the following:

$$\text{Define}: \begin{cases} a_0 = a_1 = \ldots = a_n = a \\ \xi_n = n\Delta \end{cases}$$

$$\therefore U(f_x) = A * \sum_{n=0}^{N-1}\left[a_n \text{sinc}\left(a_n\left(f_x - \frac{C}{2\pi}\right)\right)e^{-i\xi_n\left(2\pi\left(f_x - \frac{C}{2\pi}\right)+C\right)}\right] =$$

$$A * \sum_{n=0}^{N-1}\left[a\,\text{sinc}\left(a\left(f_x - \frac{C}{2\pi}\right)\right)e^{-in\Delta\left(2\pi\left(f_x - \frac{C}{2\pi}\right)+C\right)}\right]$$

When the diffraction pattern is aperiodic, the Fraunhofer equation provides the following:

$$U(f_x) = A * \sum_{n=0}^{N-1}\left[a_n \text{sinc}\left(a_n\left(f_x - \frac{C}{2\pi}\right)\right)e^{-i\xi_n\left(2\pi\left(f_x - \frac{C}{2\pi}\right)+C\right)}\right]$$

A diffraction pattern can be designed to provide a distribution of lobes as desired. This is accomplished by varying the position, phase and width of the slits in a diffraction pattern. If the pattern is made aperiodic, a different distribution of lobes will be created. With aperiodic diffraction patterns, the light bent by each slit will combine to increase the amplitude of multiple lobes, essentially creating an overlapping effect. An aperiodic diffraction pattern, on the other hand, will limit this overlapping effect and thus dampen the amplitude of the side lobes of diffraction order +/−1 and greater.

In one embodiment, the mirror sizes range from 1.5-2.5 mm. A larger variation in size makes it difficult to synchronize getting to the same angle at the same time. Not only is each mirror in a row synchronized to the same angle, but all the rows of mirrors are synchronized to the same angle. These differences are significantly more than manufacturing variances, since there currently is manufacturing accuracy with a sub-micron accuracy (~0.1-0.2 microns). In one embodiment, the rows of mirrors have differences in sizes of up to 50%. Alternately, the differences in sizes range from 10-25%.

Figure 6:
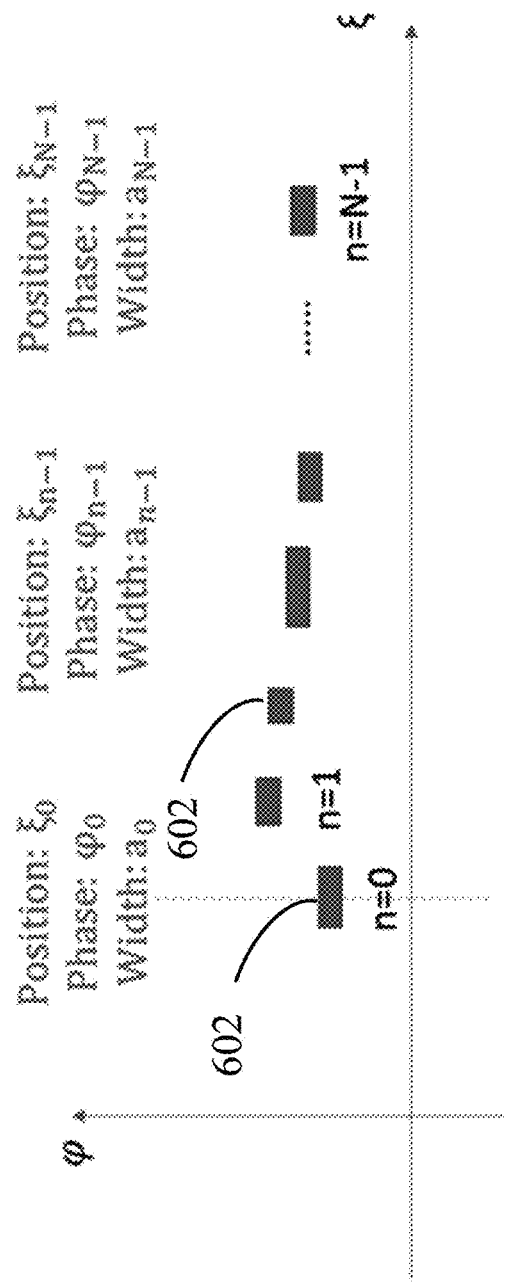
FIG. 6 is a diagram illustrating aperiodic mirror gaps according to embodiments.

FIG. 6 is a diagram illustrating aperiodic mirror gaps, according to embodiments. The x-axis shows the position (ξ) of a particular mirror. The y-axis shows the phase (φ) of each mirror. The width (a) of each mirror is illustrated by the length of each bar 602.

FIG. 7A is a diagram illustrating a mirror array 720 according to embodiments of the invention, with an aperiodic structure. Shown are seven rows 724-736 which are of unequal widths. Each row consists of a number of mirrors, such as mirrors 738, 740 and 742 in row 736. The mirrors in a particular row are all the same size in one embodiment. There are natural gaps between each row due to the limits of manufacturing tolerances. For example, gaps 744 and 746 are indicated. As can be seen, the width (w) of the rows differ. For example width 748 of row 732 is much greater than width 750 of row 734. In one embodiment, the width of the total array ranges from 10-20 mm, or in another embodiment from 12-16 mm. In one embodiment, 5-10 rows of mirrors are provided, with widths that are between 1-3 mm. In another embodiment, 6-8 rows are provided, with mirror widths varying from 1.25-2.75 mm.

Figure 7B:
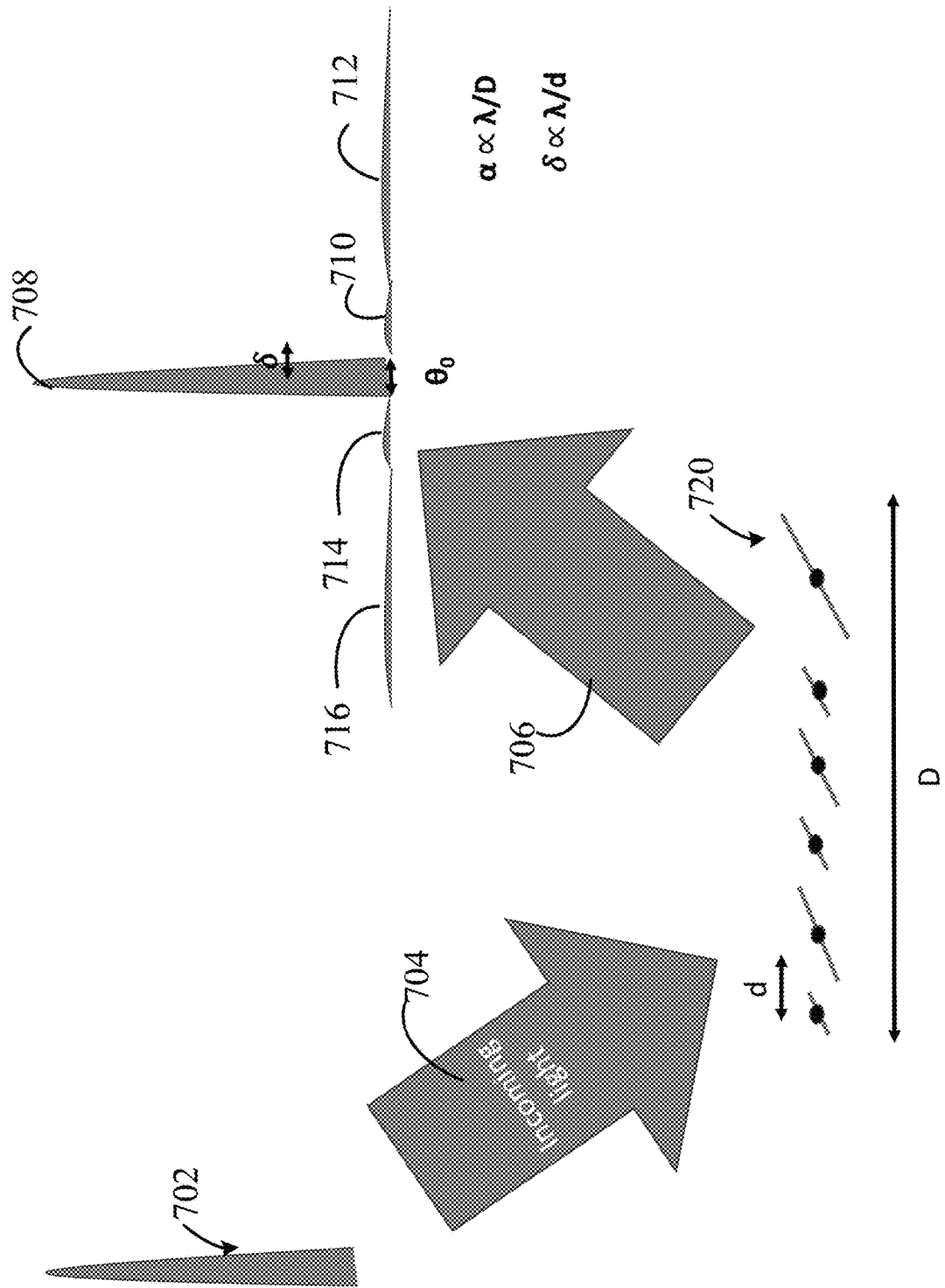
FIG. 7B is a diagram illustrating the higher order lobes spread out by the aperiodic structure of FIGS. 6 and 7A, according to embodiments.

FIG. 7B is a diagram illustrating the higher order lobes spread out by the aperiodic structure of FIGS. 6 and 7A, according to embodiments. An incoming laser beam 702, coming in as shown by arrow 704, reflects off the mirror array 720. The reflection travels as indicated by arrow 706 to produce a diffraction pattern due to the gaps between the mirrors. This diffraction produces a main, or 0 order lobe 708, which is the desired signal. But it also produces a +1 order lobe 710, a +2 order lobe 712, a −1 order lobe 714 and a −2 order lobe 716. Additional lobes of orders 3, 4, etc. may be produced, although they will be of diminished intensity. As can be seen from FIG. 7, lobes 710, 712, 714 and 716 are spread out and reduced in amplitude compared to the periodic lobes 510, 512, 514 and 516 as shown in FIG. 5.

Thus, the side lobes are much less capable of interfering with the main, or zero order lobe 708.

Figure 8:
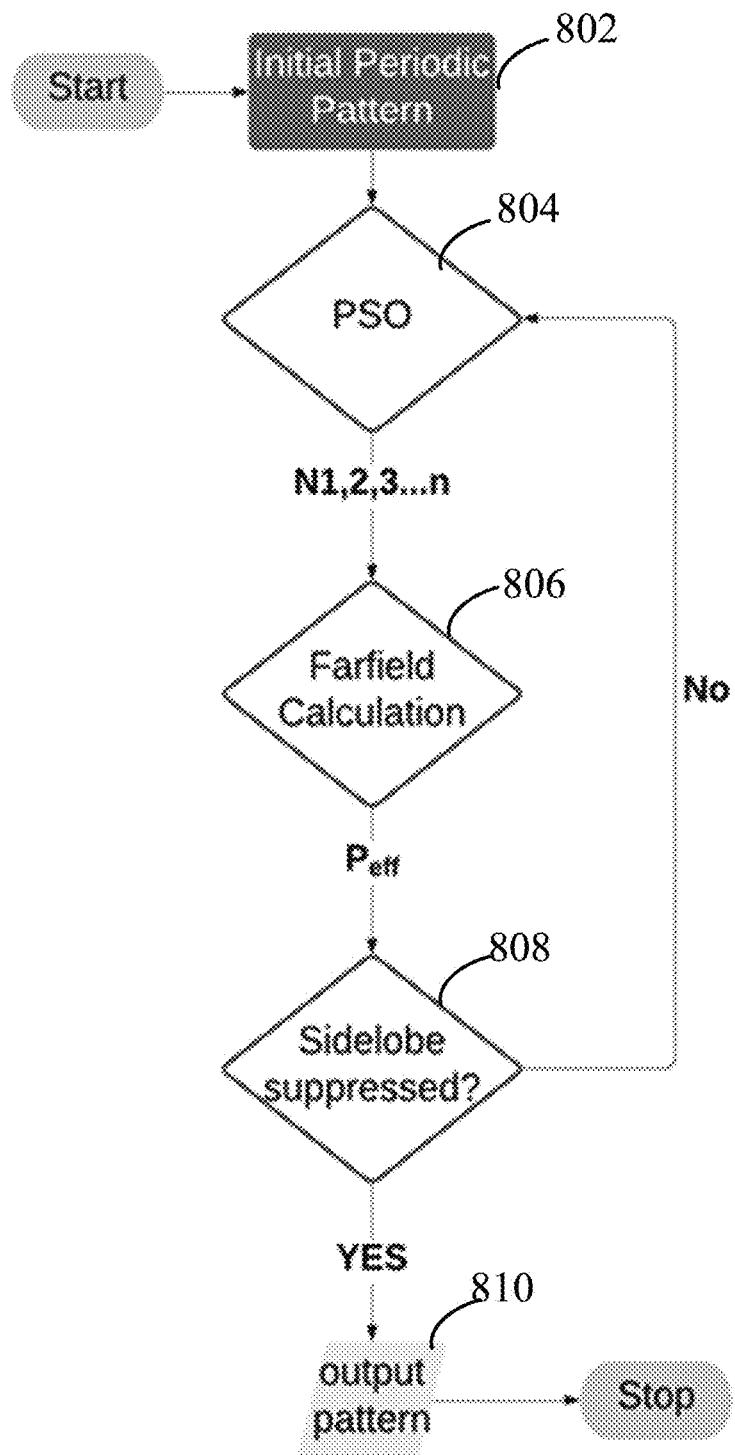
FIG. 8 is a flow chart illustrating the determination of an optimal aperiodic mirror configuration according to embodiments.

FIG. 8 is a flow chart illustrating the determination of an optimal aperiodic mirror configuration according to embodiments. This determination can be done with a programmed computer such as that illustrated in FIG. 11, discussed below. First, an initial periodic pattern is received in step 802. That periodic pattern is the gaps between mirror rows in a traditional implementation. In step 804, Particle Swarm Optimization (PSO) is performed on the pattern. PSO is a computational method that optimizes a problem by iteratively trying to improve a candidate solution with regard to a given measure of quality. It solves a problem by having a population of candidate solutions (particles). These particles are moved around in the search-space according to a mathematical formula over the particle's position and velocity. PSO is used to design diffraction gratings with a desired diffraction effect. The variable used for the pattern is the width of the mirror rows, which translates into the separation of the gaps. Since the mirror size is changeable, the number of rows can be increased or decreased accordingly.

Next, in step 806, a far field calculation is performed using the Fraunhofer diffraction equations set forth above. The result of the Fraunhofer calculations in step 806 is a diffraction pattern of side lobes. In step 810, the amplitude of those side lobes is compared to a desired maximum limit. If the side lobes are not sufficiently small, the process repeats with step 804, using another iteration in the PSO calculation. After as many repetitions as needed, when the side lobes are sufficiently small, an output pattern is generated (step 810). This output pattern is an indication of the combination of different widths of the mirrors that produces the desired spread-out side lobes of the diffraction pattern. Another optimization is choosing a pattern which maximizes the central, un-diffracted 0 node, which is the signal. Thus, at some point, further spreading of the side lobes may diminish the signal too much. In one embodiment, the width of the MEMS mirrors in different rows is varied to provide a spacing of the gaps between the rows of MEMS mirrors that is sufficiently aperiodic to provide a reduction of the intensity of a plurality of side lobes of the diffraction pattern by more than 50% of the intensity of a diffraction pattern with a periodic spacing of the gaps between the rows of MEMS mirrors.

Figure 9A:
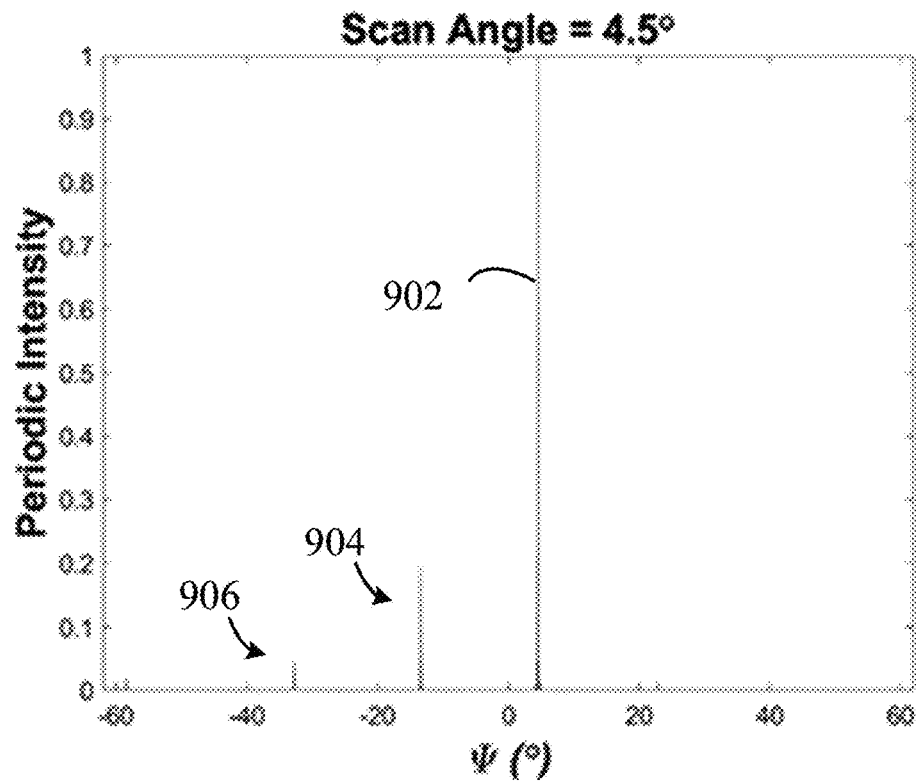
FIG. 9A is a chart illustrating the intensity of the side lobes for a periodic mirror structure, according to embodiments.

FIG. 9A is a chart illustrating the intensity of the side lobes for a periodic mirror structure, according to embodiments. The signal 902 is shown, as the 0 order diffracted beam (the un-diffracted signal). There are also sizeable side lobes 904 and 906. Side lobe 904 corresponds to the $+/-1^{st}$ order diffraction side lobe, and side lobe 906 corresponds to the $+/-2^{nd}$ order diffraction side lobe.

Figure 9B:
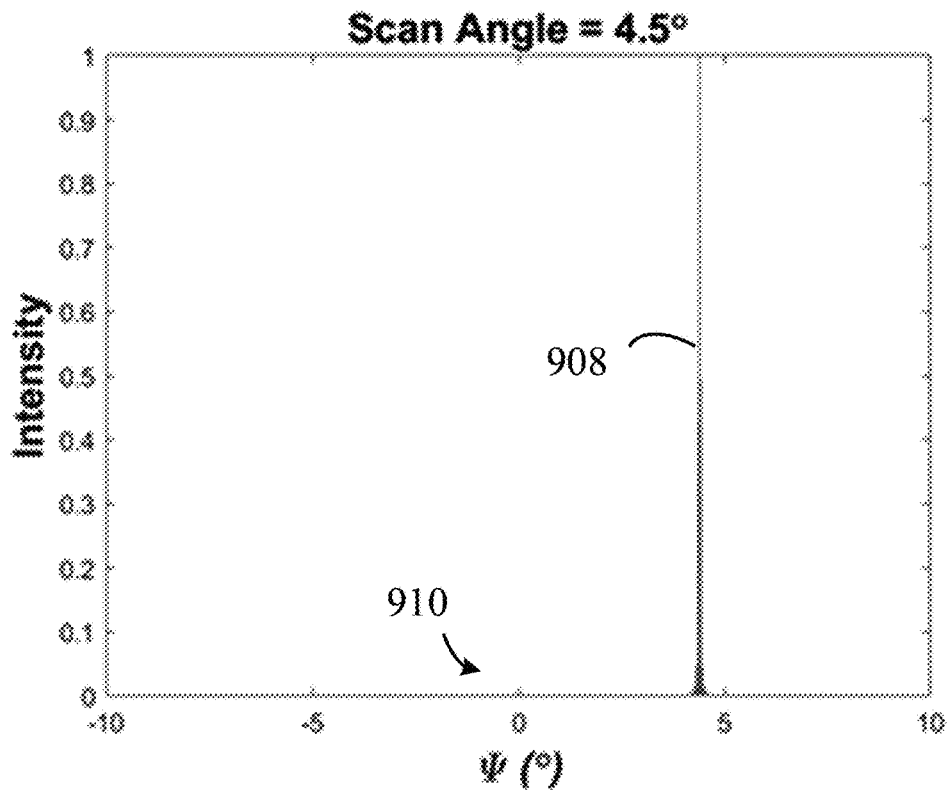
FIG. 9B is a chart illustrating the intensity of the side lobes for an aperiodic mirror structure, according to embodiments.

FIG. 9B is a chart illustrating the intensity of the side lobes for an aperiodic mirror structure, according to embodiments. The signal 908 is shown, as the 0 order diffracted beam. There are no noticeable side lobes in the area 910, where formerly, with a periodic mirror structure, there were sizeable side lobes 904 and 906.

In summary, certain embodiments provide a micro-electromechanical system (MEMS) apparatus for beam steering in a Light Detection and Ranging (LiDAR) system of an autonomous vehicle. A laser 208 emits a laser beam which covers the aperture of an array 720 of MEMS mirrors. Each mirror has a reflective surface for intercepting the laser beam and redirecting it toward an environment to be detected. The array of MEMS mirrors has a plurality of rows 724-736 of mirrors with multiple mirrors in each row. Each mirror in a row of mirrors is the same size, but multiple rows have mirrors with a different size (e.g., widths 748, 750) than adjacent rows, such that the pattern of gaps (744, 746) between rows is an irregular pattern. There is at least one detector for detecting at least one reflected beam of the laser beam. A controller is configured to control the laser and the angles of the mirrors in the array of MEMS mirrors to scan an environment.

Certain embodiments provide a method for manufacturing a MEMS mirror array. The method includes providing an array of MEMS mirrors consisting of a plurality of rows (724-736) with a plurality of MEMS mirrors (738-742) in each row. All of the MEMS mirrors are configured to rotate at the same resonant frequency to the same angles. The gaps between the rows of MEMS mirrors will produce a diffraction pattern from reflected light. The method varies the width of the MEMS mirrors in different rows to provide a spacing of the gaps between the rows of MEMS mirrors that is sufficiently aperiodic to provide a reduction of the intensity of a plurality of side lobes of the diffraction pattern by more than 50% of the intensity of a diffraction pattern with a periodic spacing of the gaps between the rows of MEMS mirrors.

One embodiment of the method provides an initial array design with all the MEMS mirrors having the same size (802). The method performs an iterative optimization (804) of the widths of the MEMS mirrors in different rows to reduce the intensity of the plurality of side lobes of the diffraction pattern. The iterative optimization changes the widths of the MEMS mirrors and then performs a far field calculation (806) using a Fraunhofer diffraction equation to determine an amplitude of the side lobes of the diffraction pattern. The amplitude of the side lobes is compared to a desired maximum limit. The widths of the MEMS mirrors are iteratively changed until the amplitude of the side lobes is less than or equal to the desired maximum limit. In one embodiment, the iterative optimization is a Particle Swarm Optimization.

Example LiDAR System Implementing Aspects of Embodiments Herein

Figure 10:
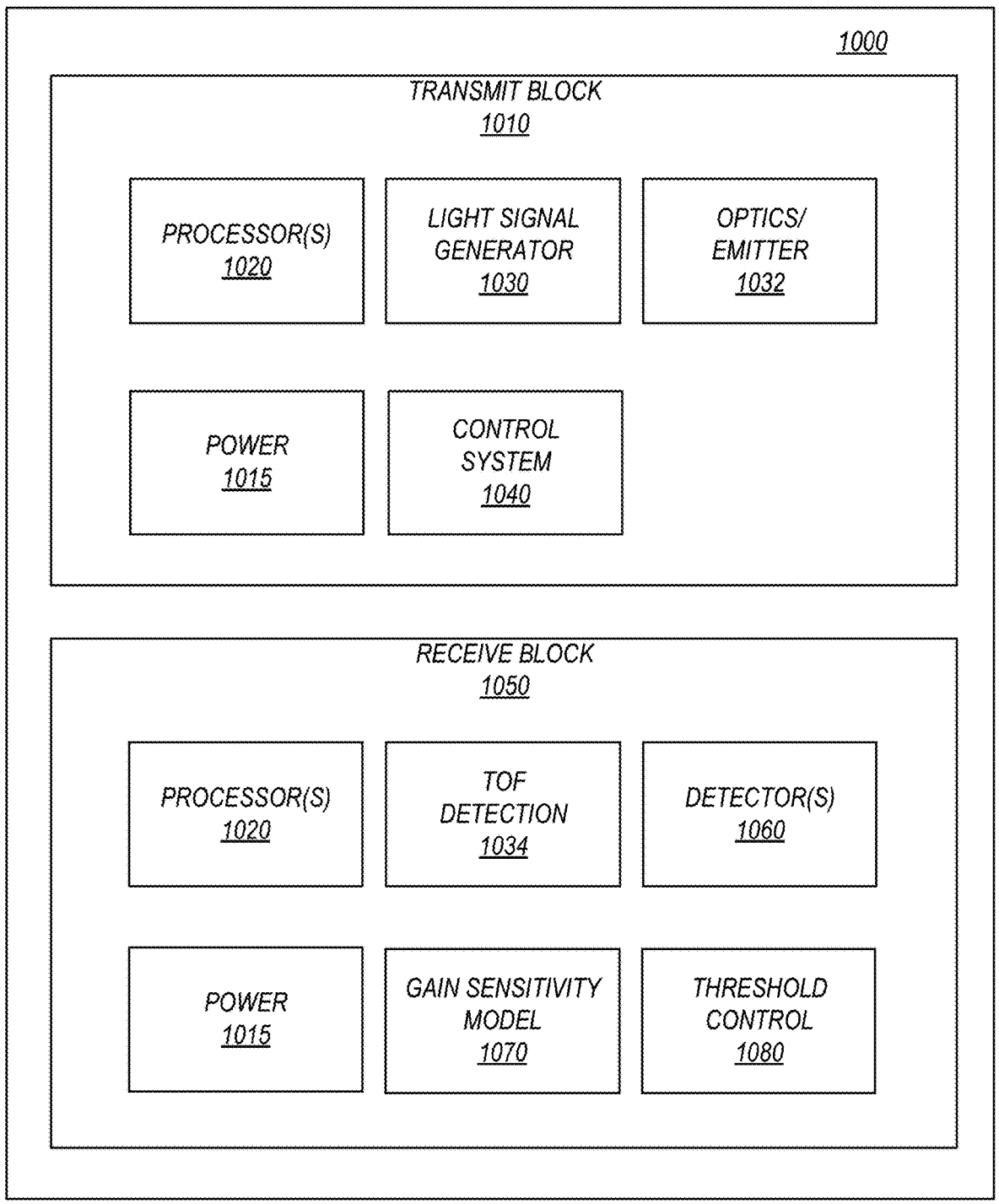
FIG. 10 illustrates a simplified block diagram showing aspects of a LiDAR-based detection system, according to certain embodiments of the invention.

FIG. 10 illustrates a simplified block diagram showing aspects of a LiDAR-based detection system 1000, according to certain embodiments. System 1000 may be configured to transmit, detect, and process LiDAR signals to perform object detection as described above with regard to LiDAR system 100 described in FIG. 1. In general, a LiDAR system 1000 includes one or more transmitters (e.g., transmit block 1010) and one or more receivers (e.g., receive block 1050). LiDAR system 1000 may further include additional systems that are not shown or described to prevent obfuscation of the novel features described herein.

Transmit block 1010, as described above, can incorporate a number of systems that facilitate that generation and emission of a light signal, including dispersion patterns (e.g., 360 degree planar detection), pulse shaping and frequency control, Time-Of-Flight (TOF) measurements, and any other control systems to enable the LiDAR system to emit pulses in the manner described above. In the simplified representation of FIG. 10, transmit block 1010 can include processor(s) 1020, light signal generator 1030, optics/emitter module 1032, power block 1015 and control system 1040. Some of all of system blocks 1020-1040 can be in electrical communication with processor(s) 1020.

In certain embodiments, processor(s) 1020 may include one or more microprocessors (μCs) and can be configured to control the operation of system 1000, such as setting the resonant frequency and angles of the mirrors. Alternatively or additionally, processor 1020 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, µCs, DSPs, ASIC, programmable logic device, and the like, may be configured in other system blocks of system 1000. For example, control system block 1040 may include a local processor to certain control parameters (e.g., operation of the emitter). Processor(s) 1020 may control some or all aspects of transmit block 1010 (e.g., optics/emitter 1032, control system 1040, dual sided mirror 220 position as shown in FIG. 1, position sensitive device 250, etc.), receive block 1050 (e.g., processor(s) 1020) or any aspects of LiDAR system 1000. In some embodiments, multiple processors may enable increased performance characteristics in system 1000 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

Light signal generator 1030 may include circuitry (e.g., a laser diode) configured to generate a light signal, which can be used as the LiDAR send signal, according to certain embodiments. In some cases, light signal generator 1030 may generate a laser that is used to generate a continuous or pulsed laser beam at any suitable electromagnetic wavelengths spanning the visible light spectrum and non-visible light spectrum (e.g., ultraviolet and infra-red). In some embodiments, lasers are commonly in the range of 600-1200 nm, although other wavelengths are possible, as would be appreciated by one of ordinary skill in the art.

Optics/Emitter block 1032 (also referred to as transmitter 1032) may include one or more arrays of mirrors (including but not limited to dual sided mirror 220 as described above in FIGS. 1-6) for redirecting and/or aiming the emitted laser pulse, mechanical structures to control spinning and/or moving of the emitter system, or other system to affect the system field-of-view, as would be appreciated by one of ordinary skill in the art with the benefit of this disclosure. For instance, some systems may incorporate a beam expander (e.g., convex lens system) in the emitter block that can help reduce beam divergence and increase the beam diameter. These improved performance characteristics may mitigate background return scatter that may add noise to the return signal. In some cases, optics/emitter block 1032 may include a beam splitter to divert and sample a portion of the pulsed signal. For instance, the sampled signal may be used to initiate the TOF clock. In some cases, the sample can be used as a reference to compare with backscatter signals. Some embodiments may employ micro electromechanical mirrors (MEMS) that can reorient light to a target field. Alternatively or additionally, multi-phased arrays of lasers may be used. Any suitable system may be used to emit the LiDAR send pulses, as would be appreciated by one of ordinary skill in the art.

Power block 1015 can be configured to generate power for transmit block 1010, receive block 1050, as well as manage power distribution, charging, power efficiency, and the like. In some embodiments, power management block 1015 can include a battery (not shown), and a power grid within system 1000 to provide power to each subsystem (e.g., control system 1040, etc.). The functions provided by power management block 1015 may be subsumed by other elements within transmit block 1010, or may provide power to any system in LiDAR system 1000. Alternatively, some embodiments may not include a dedicated power block and power may be supplied by a number of individual sources that may be independent of one another.

Control system 1040 may control aspects of light signal generation (e.g., pulse shaping), optics/emitter control, TOF timing, or any other function described herein. In some cases, aspects of control system 1040 may be subsumed by processor(s) 1020, light signal generator 1030, or any block within transmit block 1010, or LiDAR system 1000 in general.

Receive block 1050 may include circuitry configured to detect a process a return light pulse to determine a distance of an object, and in some cases determine the dimensions of the object, the velocity and/or acceleration of the object, and the like. Processor(s) 1065 may be configured to perform operations such as processing received return pulses from detectors(s) 1060, controlling the operation of TOF module 1034, controlling threshold control module 1080, or any other aspect of the functions of receive block 1050 or LiDAR system 1000 in general.

TOF module 1034 may include a counter for measuring the time-of-flight of a round trip for a send and return signal. In some cases, TOF module 1034 may be subsumed by other modules in LiDAR system 1000, such as control system 1040, optics/emitter 1032, or other entity. TOF modules 1034 may implement return "windows" that limit a time that LiDAR system 1000 looks for a particular pulse to be returned. For example, a return window may be limited to a maximum amount of time it would take a pulse to return from a maximum range location (e.g., 250 m). Some embodiments may incorporate a buffer time (e.g., maximum time plus 10%). TOF module 1034 may operate independently or may be controlled by other system block, such as processor(s) 1020, as described above. In some embodiments, transmit block may also include a TOF detection module. One of ordinary skill in the art with the benefit of this disclosure would appreciate the many modification, variations, and alternative ways of implementing the TOF detection block in system 1000.

Detector(s) 1060 may detect incoming return signals that have reflected off of one or more objects. In some cases, LiDAR system 1000 may employ spectral filtering based on wavelength, polarization, and/or range to help reduce interference, filter unwanted frequencies, or other deleterious signals that may be detected. Typically, detector(s) 1060 can detect an intensity of light and records data about the return signal (e.g., via coherent detection, photon counting, analog signal detection, or the like). Detector (s) 1060 can use any suitable photodetector technology including solid state photodetectors (e.g., silicon avalanche photodiodes, complimentary metal-oxide semiconductors (CMOS), charge-coupled devices (CCD), hybrid CMOS/CCD devices) or photomultipliers. In some cases, a single receiver may be used or multiple receivers may be configured to operate in parallel.

Gain sensitivity model 1070 may include systems and/or algorithms for determining a gain sensitivity profile that can be adapted to a particular object detection threshold. The gain sensitivity profile can be modified based on a distance (range value) of a detected object (e.g., based on TOF measurements). In some cases, the gain profile may cause an object detection threshold to change at a rate that is inversely proportional with respect to a magnitude of the object range value. A gain sensitivity profile may be generated by hardware/software/firmware, or gain sensor model 1070 may employ one or more look up tables (e.g., stored in a local or remote database) that can associate a gain value with a particular detected distance or associate an appropriate mathematical relationship there between (e.g., apply a particular gain at a detected object distance that is 10% of a maximum range of the LiDAR system, apply a different gain at 15% of the maximum range, etc.). In some cases, a Lambertian model may be used to apply a gain sensitivity profile to an object detection threshold. The Lambertian model typically represents perfectly diffuse (matte) surfaces by a constant bidirectional reflectance distribution function (BRDF), which provides reliable results in LiDAR system as described herein. However, any suitable gain sensitivity profile can be used including, but not limited to, Oren-Nayar model, Nanrahan-Krueger, Cook-Torrence, Diffuse BRDF, Limmel-Seeliger, Blinn-Phong, Ward model, HTSG model, Fitted Lafortune Model, or the like. One of ordinary skill in the art with the benefit of this disclosure would understand the many alternatives, modifications, and applications thereof.

Threshold control block 1080 may set an object detection threshold for LiDAR system 1000. For example, threshold control block 1080 may set an object detection threshold over a certain a full range of detection for LiDAR system 1000. The object detection threshold may be determined based on a number of factors including, but not limited to, noise data (e.g., detected by one or more microphones) corresponding to an ambient noise level, and false positive data (typically a constant value) corresponding to a rate of false positive object detection occurrences for the LiDAR system. In some embodiments, the object detection threshold may be applied to the maximum range (furthest detectable distance) with the object detection threshold for distances ranging from the minimum detection range up to the maximum range being modified by a gain sensitivity model (e.g., Lambertian model).

Although certain systems may not expressly discussed, they should be considered as part of system 1000, as would be understood by one of ordinary skill in the art. For example, system 1000 may include a bus system (e.g., CAMBUS) to transfer power and/or data to and from the different systems therein. In some embodiments, system 1000 may include a storage subsystem (not shown). A storage subsystem can store one or more software programs to be executed by processors (e.g., in processor(s) 1020). It should be understood that "software" can refer to sequences of instructions that, when executed by processing unit(s) (e.g., processors, processing devices, etc.), cause system 1000 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein. Some software controlled aspects of LiDAR system 1000 may include aspects of gain sensitivity model 1070, threshold control 1080, control system 1040, TOF module 1034, or any other aspect of LiDAR system 1000.

It should be appreciated that system 1000 is meant to be illustrative and that many variations and modifications are possible, as would be appreciated by one of ordinary skill in the art. System 1000 can include other functions or capabilities that are not specifically described here. For example, LiDAR system 1000 may include a communications block (not shown) configured to enable communication between LiDAR system 1000 and other systems of the vehicle or remote resource (e.g., remote servers), etc., according to certain embodiments. In such cases, the communications block can be configured to provide wireless connectivity in any suitable communication protocol (e.g., radio-frequency (RF), Bluetooth, BLE, infra-red (IR), ZigBee, Z-Wave, Wi-Fi, or a combination thereof).

While system 1000 is described with reference to particular blocks (e.g., threshold control block 1080), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 1000 may be combined with or operated by other sub-systems as informed by design. For example, power management block 1015 and/or threshold control block 1080 may be integrated with processor(s) 1020 instead of functioning as separate entities.

Example Computer Systems Implementing Aspects of Embodiments Herein

Figure 11:
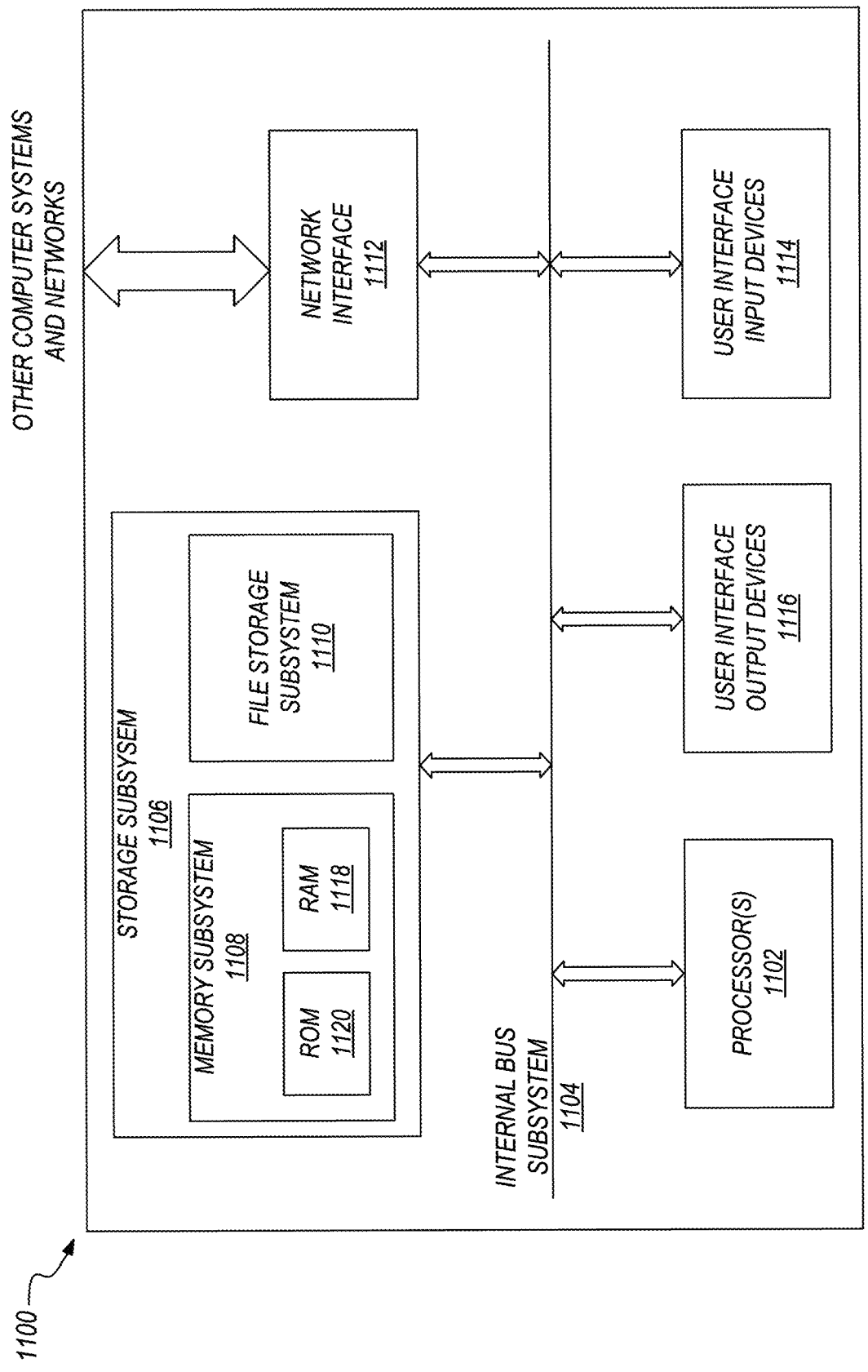
FIG. 11 illustrates an example computer system that may be utilized to implement techniques disclosed herein, according to certain embodiments of the invention.

FIG. 11 is a simplified block diagram of computer system 1100 configured to operate aspects of a LiDAR-based detection system, according to certain embodiments. Computer system 1100 can be used to implement any of the systems and modules discussed above with respect to FIGS. 1-6. For example, computer system 1100 may operate aspects of threshold control 1080, TOF module 1034, processor(s) 1020, control system 1040, or any other element of LiDAR system 1000 or other system described herein. Computer system 1100 can include one or more processors 1102 that can communicate with a number of peripheral devices (e.g., input devices) via a bus subsystem 1104. These peripheral devices can include storage subsystem 1106 (comprising memory subsystem 1108 and file storage subsystem 1110), user interface input devices 1114, user interface output devices 1116, and a network interface sub system 1112.

In some examples, internal bus subsystem 1104 (e.g., CAMBUS) can provide a mechanism for letting the various components and subsystems of computer system 1100 communicate with each other as intended. Although internal bus subsystem 1104 is shown schematically as a single bus, alternative embodiments of the bus subsystem can utilize multiple buses. Additionally, network interface subsystem 1112 can serve as an interface for communicating data between computer system 1100 and other computer systems or networks. Embodiments of network interface subsystem 1112 can include wired interfaces (e.g., Ethernet, CAN, RS232, RS485, etc.) or wireless interfaces (e.g., ZigBee, Wi-Fi, cellular, etc.).

In some cases, user interface input devices 1114 can include a keyboard, pointing devices (e.g., mouse, trackball, touchpad, etc.), a barcode scanner, a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 1100. Additionally, user interface output devices 1116 can include a display subsystem, a printer, or non-visual displays such as audio output devices, etc. The display subsystem can be any known type of display device. In general, use of the term "output device" is intended to include all possible types of devices and mechanisms for outputting information from computer system 1100.

Storage subsystem 1106 can include memory subsystem 1108 and file/disk storage subsystem 1110. Subsystems 1108 and 1110 represent non-transitory computer-readable storage media that can store program code and/or data that provide the functionality of embodiments of the present disclosure. In some embodiments, memory subsystem 1108 can include a number of memories including main random access memory (RAM) 1118 for storage of instructions and data during program execution and read-only memory (ROM) 1120 in which fixed instructions may be stored. File storage subsystem 1110 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1100 is illustrative and not intended to limit embodiments of the present disclosure. Many other configurations having more or fewer components than system 1100 are possible.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local-area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the examples, alternative examples, etc., and the concepts thereof may be applied to any other examples described and/or within the spirit and scope of the disclosure.

For example, instead of using a single laser to illuminate the array of MEMS mirrors, an array of mirrors may be used. Also, the pattern generation and decoding could be hardwired, in firmware or in software in different embodiments.

The MEMS mirror structure of the present invention can be used in a variety of other applications than LIDAR. Light beam steering techniques can also be used in other optical systems, such as optical display systems (e.g., TVs), optical sensing systems, optical imaging systems, and the like. In various light beam steering systems, the light beam may be steered by, for example, a rotating platform driven by a motor, a multi-dimensional mechanical stage, a Galvo-controlled mirror, a resonant fiber, an array of microelectromechanical (MEMS) mirrors, or any combination thereof. A MEMS micro-mirror may be rotated around a pivot or connection point by, for example, a micro-motor, an electromagnetic actuator, an electrostatic actuator, or a piezoelectric actuator.

The MEMS mirror structure of the present invention can have the mirror mass driven by different types of actuators. In some light steering systems, the transmitted or received light beam may be steered by an array of micro-mirrors. Each micro-mirror may rotate around a pivot or connection point to deflect light incident on the micro-mirror to desired directions. The performance of the micro-mirrors may directly affect the performance of the light steering system, such as the field of view (FOV), the quality of the point cloud, and the quality of the image generated using a light steering system. For example, to increase the detection range and the FOV of a LiDAR system, micro-mirrors with large rotation angles and large apertures may be used, which may cause an increase in the maximum displacement and the moment of inertia of the micro-mirrors. To achieve a high resolution, a device with a high resonant frequency may be used, which may be achieved using a rotating structure with a high stiffness. It may be difficult to achieve this desired performance using electrostatic actuated micro-mirrors because comb fingers used in an electrostatic-actuated micro-mirror may not be able to provide the force and moment needed and may disengage at large rotation angles, in particular, when the aperture of the micro-mirror is increased to improve the detection range. Some piezoelectric actuators may be used to achieve large displacements and large scanning angles due to their ability to provide a substantially larger drive force than electrostatic-actuated types, with a relatively lower voltage.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the examples, alternative examples, etc., and the concepts thereof may be applied to any other examples described and/or within the spirit and scope of the disclosure.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

What is claimed is:

1. A method for manufacturing a MEMS mirror array comprising:
   providing an array of MEMS mirrors consisting of a plurality of rows with a plurality of MEMS mirrors in each row, wherein all of the MEMS mirrors are configured to rotate at the same resonant frequency to the same angles;
   wherein gaps between the rows of MEMS mirrors will produce a diffraction pattern from reflected light;
   varying a width of the MEMS mirrors in different rows to provide a spacing of the gaps between the rows of MEMS mirrors that is sufficiently aperiodic to provide a reduction of an intensity of a plurality of side lobes of the diffraction pattern by more than 50% of an intensity of a diffraction pattern with a periodic spacing of the gaps between the rows of MEMS mirrors;
   providing an initial array design with all the MEMS mirrors having the same size; and
   performing an iterative optimization of the width of the MEMS mirrors in different rows to reduce the intensity of the plurality of side lobes of the diffraction pattern.

2. The method of claim 1 wherein the MEMS mirror widths range from 1.5-2.5 mm.

3. The method of claim 1 wherein the width of the array of MEMS mirrors ranges from 12-16 mm.

4. The method of claim 1 wherein 6-8 rows of MEMS mirrors are provided, with MEMS mirror widths that are between 1.25-2.75 mm.

5. The method of claim 1 wherein all of the MEMS mirrors have the same length, and all of the MEMS mirrors in each row have the same width.

6. The method of claim 1 wherein a width of the MEMS mirrors varies by row by up to 50%.

7. The method of claim 1 wherein the width of the MEMS mirrors range from 1.5-2.5 mm.

8. The method of claim 1 wherein a width of the MEMS mirrors varies by row by from 10-25%.

9. The method of claim 1 wherein a width of the array of MEMS mirrors ranges from 10-20 mm.

10. The method of claim 9 wherein a width of the array of MEMS mirrors ranges from 12-16 mm.

11. The method of claim 1 wherein 5-10 rows of MEMS mirrors are provided, with MEMS mirror widths that are between 1-3 mm.

12. The method of claim 1 further comprising:
controlling a laser and the angles of the MEMS mirrors in the array of MEMS mirrors to scan an environment.

13. The method of claim 1 wherein performing an iterative optimization further comprises:
changing the width of the MEMS mirrors;
performing a far field calculation using a Fraunhofer diffraction equation to determine an amplitude of the side lobes of the diffraction pattern; and
comparing the amplitude of the side lobes to a desired maximum limit; and
changing the width of the MEMS mirrors until the amplitude of the side lobes is less than or equal to the desired maximum limit.

14. The method of claim 1 wherein the iterative optimization is a Particle Swarm Optimization.

15. The method of claim 1 further comprising:
placing the MEMS mirror array in a chip package;
providing a laser for emitting a laser beam;
providing at least one detector for detecting at least one reflected beam of the laser beam; and
placing the MEMS mirror array, laser and detector in a micro-electromechanical system (MEMS) apparatus for beam steering in a Light Detection and Ranging (LiDAR) system of an autonomous vehicle.

16. The method of claim 1 wherein the iterative optimization further comprises choosing a pattern of MEMS mirror widths which maximizes a central, un-diffracted 0 node, which is a desired signal.

17. The method of claim 1 wherein an optimized width of the array of MEMS mirrors ranges from 10-20 mm; and
wherein 5-10 rows of mirrors are provided, with mirror widths that are between 1-3 mm.

* * * * *